(12) United States Patent
Schmidt et al.

(10) Patent No.: US 10,627,245 B2
(45) Date of Patent: Apr. 21, 2020

(54) VEHICLE SERVICE CONTROL

(71) Applicant: Ford Global Technologies, LLC, Dearborn, MI (US)

(72) Inventors: David J. Schmidt, Dearborn, MI (US); Harry Lobo, Canton, MI (US); Vankatesh Krishnan, Canton, MI (US); Paul Kenneth Dellock, Northville, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 261 days.

(21) Appl. No.: 15/726,341

(22) Filed: Oct. 5, 2017

(65) Prior Publication Data
US 2019/0107401 A1 Apr. 11, 2019

(51) Int. Cl.
| | |
|---|---|
| *G01C 21/34* | (2006.01) |
| *G06Q 10/06* | (2012.01) |
| *G06Q 10/00* | (2012.01) |
| *G01C 21/36* | (2006.01) |
| *G05D 1/00* | (2006.01) |
| *G05D 1/02* | (2020.01) |

(52) U.S. Cl.
CPC ... *G01C 21/3415* (2013.01); *G06Q 10/06316* (2013.01); *G06Q 10/20* (2013.01); *G01C 21/3469* (2013.01); *G01C 21/3697* (2013.01); *G05D 1/0088* (2013.01); *G05D 1/0276* (2013.01)

(58) Field of Classification Search
CPC ............ G01C 21/3415; G01C 21/3469; G01C 21/3697; G05D 1/0088; G05D 1/0276; G06Q 10/06316; G06Q 10/20; B60S 1/603; H04L 67/12
See application file for complete search history.

(56) References Cited

U.S. PATENT DOCUMENTS

| | | | |
|---|---|---|---|
| 4,000,835 A * | 1/1977 | Bassett | B60S 5/00 222/183 |
| 6,236,180 B1 | 5/2001 | Contos et al. | |
| 7,073,379 B2 | 7/2006 | Schroth et al. | |
| 7,263,417 B2 | 8/2007 | Gutierrez et al. | |

(Continued)

FOREIGN PATENT DOCUMENTS

| | | |
|---|---|---|
| DE | 3825630 A1 | 2/1990 |
| DE | 102008021382 A1 | 11/2009 |

(Continued)

OTHER PUBLICATIONS

Non-Final Office Action dated Nov. 12, 2019; U.S. Appl. No. 15/907,692, filed Feb. 28, 2018.

(Continued)

*Primary Examiner* — Alan D Hutchinson
(74) *Attorney, Agent, or Firm* — Frank A. MacKenzie; Bejin Bieneman PLC

(57) ABSTRACT

A system, including a processor and a memory, the memory including instructions to be executed by the processor to determine a fluid level of a fluid in a vehicle determine a planned vehicle route; and after and in response to uploading the fluid level and the planned vehicle route to a server, actuating a vehicle component to replenish the fluid according to a command from the server.

20 Claims, 7 Drawing Sheets

(56) References Cited

U.S. PATENT DOCUMENTS

| | | |
|---|---|---|
| 9,126,534 B2 | 9/2015 | Snider |
| 9,278,670 B2 | 3/2016 | Hattori et al. |
| 9,520,006 B1 | 12/2016 | Sankovsky et al. |
| 10,042,359 B1 * | 8/2018 | Konrardy ................ B60L 58/12 |
| 2012/0101704 A1 | 4/2012 | Wagner |
| 2015/0206359 A1 | 7/2015 | Ahmad et al. |
| 2016/0139600 A1 | 5/2016 | Delp |
| 2016/0186648 A1 | 6/2016 | Rollinger et al. |
| 2016/0244028 A1 | 8/2016 | Wakatski |
| 2018/0293818 A1 | 10/2018 | Linsmeier et al. |
| 2018/0321071 A1 | 11/2018 | Larsen |
| 2019/0161035 A1 | 5/2019 | Satter et al. |

FOREIGN PATENT DOCUMENTS

| | | |
|---|---|---|
| DE | 102009039145 A1 | 3/2011 |
| DE | 102015210312 A1 | 12/2016 |
| DE | 102015223557 A1 | 6/2017 |
| DE | 102016206129 A1 | 10/2017 |
| WO | 2017095913 A1 | 6/2017 |

OTHER PUBLICATIONS

Non-Final Office Action dated Feb. 25, 2020; U.S. Appl. No. 15/907,692 filed Feb. 28, 2018.

* cited by examiner

300

VEHICLE SERVICE CONTROL

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. Safe and comfortable piloting of the vehicle can depend upon acquiring accurate and timely information regarding the vehicle's environment. Therefore, it is very important that vehicle sensors provide the most accurate data possible concerning the vehicle's environment. To this end, sensor cleaning systems may be provided so that lenses and the like are maintained to provide a clear field of view for sensors. However, it is a problem that such a cleaning system may not be available, e.g., in a state to provide cleaning to allow sensor operation that in turn allows safe an efficient vehicle operation, e.g., because the sensor cleaning system is not maintained and/or is not in a state to provide cleaning.

DETAILED DESCRIPTION

Figure 1:
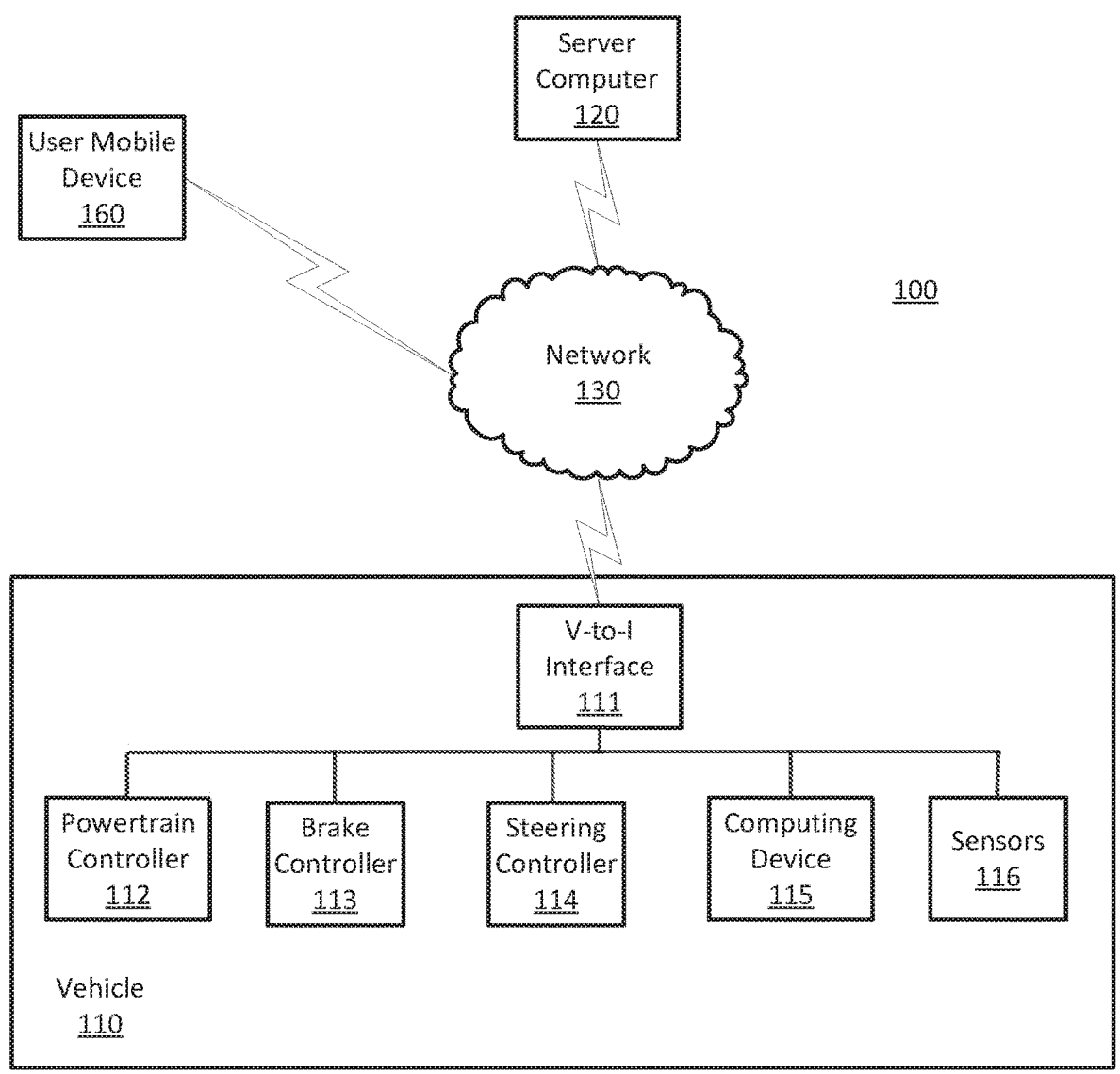
FIG. 1 is a block diagram of an example vehicle.

Disclosed herein is a method, comprising determining a fluid level of a fluid in a vehicle, determining a planned vehicle route, and after and in response to uploading the fluid level and the planned vehicle route to a server, actuating a vehicle component to replenish the fluid according to a command from the server, wherein the fluid is one of fuel and a cleaning fluid and wherein the cleaning fluid cleans vehicle sensor windows. The planned vehicle route and the amount of fluid required per unit distance of travel can be determined by communicating with a server computer via a network. The planned vehicle route can be determined based a location of the vehicle and receiving a request for transportation at the server computer. The fluid required per unit of distance traveled can be determined based on the planned vehicle route accounting for predicted weather conditions. The fluid required per unit of distance traveled can be determined based on the plurality of planned vehicle routes accounting for predicted road conditions.

Whether to actuate the vehicle component to travel the planned vehicle route or actuate the vehicle component to travel to replenish the fluid can be determined based on transmitting the fluid level to the server computer and receiving a command from the server computer. A command to replenish the fluid before completing the planned vehicle route or a command to replenish the fluid at a vehicle service location can be received from the server computer. The fluid required per unit of distance traveled can be determined based on the planned vehicle route accounting for predicted traffic contingencies, wherein predicted traffic contingencies include emergencies, delays, and detours. The server computer can determine the command based on the uploaded fluid level and the planned vehicle route. The server computer can determine the command by processing the uploaded fluid level, the planned vehicle route, and vehicle data with an AI engine to determine the command. Vehicle data can include vehicle location, cleaning events to empty estimate, rain sensor and wiper data, speed and direction data, sunlight sensor data, ambient temperature data and external lighting data.

Further disclosed is a computer readable medium, storing program instructions for executing some or all of the above method steps. Further disclosed is a computer programmed for executing some or all of the above method steps, including a computer apparatus, programmed to determine a fluid level of a fluid in a vehicle, determine a planned vehicle route, and after and in response to uploading the fluid level and the planned vehicle route to a server, actuate a vehicle component to replenish the fluid according to a command from the server, wherein the fluid is one of fuel and a cleaning fluid and wherein the cleaning fluid cleans vehicle sensor windows. The planned vehicle route and the amount of fluid required per unit distance of travel can be determined by communicating with a server computer via a network. The planned vehicle route can be determined based a location of the vehicle and receiving a request for transportation at the server computer. The fluid required per unit of distance traveled can be determined based on the planned vehicle route accounting for predicted weather conditions. The fluid required per unit of distance traveled can be determined based on the plurality of planned vehicle routes accounting for predicted road conditions.

The computer can be further programmed to determine whether to actuate the vehicle component to travel the planned vehicle route or actuate the vehicle component to travel to replenish the fluid can be determined based on transmitting the fluid level to the server computer and receiving a command from the server computer. A command to replenish the fluid before completing the planned vehicle route or a command to replenish the fluid at a vehicle service location can be received from the server computer. The fluid required per unit of distance traveled can be determined based on the planned vehicle route accounting for predicted traffic contingencies, wherein predicted traffic contingencies include emergencies, delays, and detours. The server computer can determine the command based on the uploaded fluid level and the planned vehicle route. The server computer can determine the command by processing the uploaded fluid level, the planned vehicle route, and vehicle data with an AI engine to determine the command. Vehicle data can include vehicle location, cleaning events to empty estimate, rain sensor and wiper data, speed and direction data, sunlight sensor data, ambient temperature data and external lighting data.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
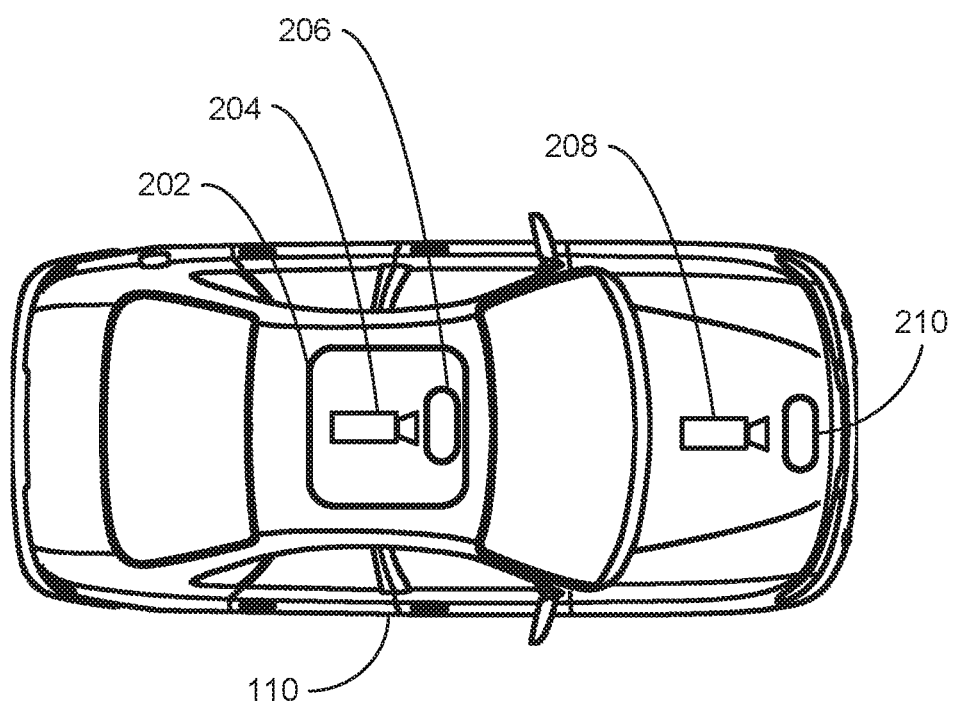
FIG. 2 is a diagram of an example vehicle with sensors.

FIG. 2 is a diagram of a vehicle 110 equipped with sensors 116, in this example embodied as video cameras 204, 208, but could be radar, LIDAR or other sensors 116 as discussed above in relation to FIG. 1. A video camera 204 can be housed in a sensor pod 202 attached to an exterior surface of vehicle 110, such as a roof portion, or housed within a body panel of vehicle 110, like video camera 208. Video cameras 204, 208 can be provided in a housing or the like that includes a protective window 206, 210, respectively, to prevent exterior environmental elements like dirt, mud, ice, snow or rain from reaching video cameras 204, 208 while permitting video cameras 204, 208 to view the environment surrounding vehicle 110.

Figure 3:
FIG. 3 is a diagram of examples of sensor data.
Figure 3:

FIG. 3 is a diagram of two frames of video data from sensors 116 such as video cameras 204, 208. Video image 302 shows a view of traffic on a roadway in front of vehicle 110. Video image 302 can be input to computing device 115 and processed to obtain data to be used to pilot vehicle 110. Video image 304 shows a view of traffic on a roadway partially obscured by a foreign substance 306 on a protective window 206, 210 that protects video cameras 204, 208. Presence of a foreign substance 306 on a protective window 206, 210 can impede computing device from processing the video image to obtain data to be used to pilot vehicle 110, for example. Foreign substance 306 can be dirt, dust, mud, snow, ice, or any other substance that can stick to a protective window 206, 210. Foreign substance 306 can come from any portion of the environment that vehicle 110 travels in, for example precipitation from the sky or debris from a roadway.

Figure 4:
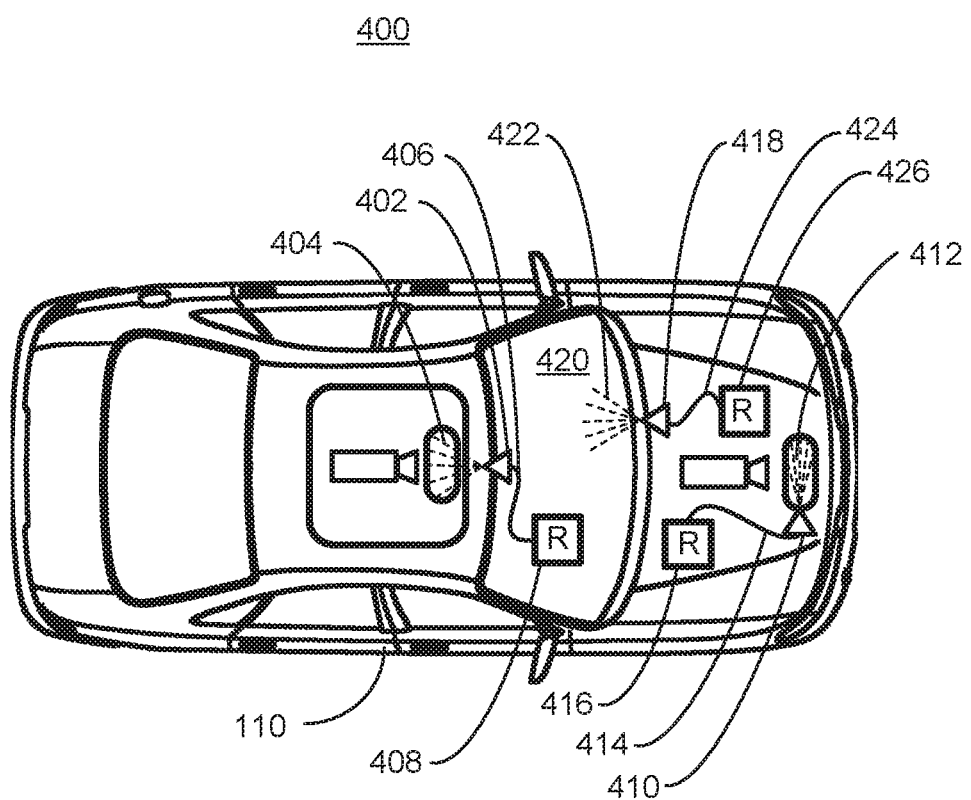
FIG. 4 is a diagram of an example vehicle with sensors and cleaning fluid sprays.

FIG. 4 is a diagram of a vehicle 110 configured with a washer system 400 to clean protective windows 206, 210 and vehicle 110 windshield 420, for example. Washer system 400 includes spray nozzles 402, 410, 418, configured to spray 404, 412, 422 cleaning fluid onto protective windows 206, 210 and windshield 420. Mechanical wipers (i.e. windshield wipers), in addition to spray nozzles 402, 410, 418, can further be provided to assist in cleaning protective windows 206, 210 and windshield 420. Spray nozzles 402, 410, 418 are supplied with cleaning fluid or water by hoses 406, 414, 424 that connect spray nozzles 402, 410, 418 to cleaning fluid reservoirs 408, 416, 426. Cleaning fluid can be a water-based fluid that contains soaps and detergents to help clean the protective windows 206, 210 and windshield 420, and antifreeze to keep the cleaning fluid liquid at low temperatures, for example.

Cleaning fluid reservoirs, can be separate, and can each require refilling separately, or cleaning reservoirs 408, 416, 426 can be connected with one other via hoses 406, 414, 424 to permit cleaning fluid to be shared among the cleaning fluid reservoirs 408, 416, 426. In an example, one of the cleaning fluid reservoirs 408, 416, 426 can be a central reservoir connected to the other reservoirs 408, 416, 426 with hoses and pumps, that can transfer fluid from the central reservoir to the other reservoirs 408, 416, 426. In any of these examples, each reservoir 408, 416, 426 can be configured with a fluid gauge that determines the amount of cleaning fluid present in each reservoir 408, 416, 426. A fluid gauge can be mechanical, employing a float and a sensor to detect the position of the float, optical, employing light-emitting and light-detecting elements to detect the amount of fluid in a reservoir 408, 416, 426, or ultrasonic, where sound waves are employed to detect the level of fluid in a reservoir 408, 416, 426, for example. Fluid gauges can detect the amount of fluid remaining in reservoirs 408, 416, 426 and report the detected fluid levels to computing device 115, for example.

Vehicle 110 can be subject to a range of operational limitations associated with general maintenance, including but not limited to low fuel, flat or low-pressure tires, oil changes, etc. A vehicle 110 can be subject to operational limitations associated with degraded data quality from externally and internally mounted sensors 116. These sensors 116, such as video cameras and LIDAR, can experience degraded image quality, due to obstruction of light because of accumulated debris on their protective window 206, 210 surfaces due to external environmental factors such as rain, ice, snow, road dirt, etc., as discussed above in relation to FIG. 3.

Reduced sensor performance can be detrimental to the robust operation of autonomous vehicles due to reduced object and/or hazard detection. Consequently, the protective windows 206, 210 may be subjected to frequent cleaning by washer fluid spray to provide sensor protective window 206, 210 surface cleanliness and transparency. Due to this potential for high number of cleaning events, the possibility of experiencing low washer fluid level can be increased significantly. The same logic can be applied to other fluid levels in vehicle 110 including fuel levels, for example. In addition, washer fluid consumption can be further exacerbated by the possibility that the vehicle 110 windshield 420 may also be cleaned occasionally that a vehicle occupant can see the outside world more clearly. The cleaning of the windshield 420 can be automated and would significantly increase the consumption of washer fluid and impact the availability of washer fluid for cleaning protective windows 206, 210.

A vehicle 110 can broadcast washer fluid level status to a server computer 120 via V-to-I interface 111 via a communication mechanism such as cellular or WiFi as discussed above in relation to FIG. 1. A vehicle 110 can report washer fluid level or available quantity of washer fluid (as well as other fluid levels like fuel level) required to support a mission in total with acceptable margins or reserves. A vehicle 110 mission is a series of one or more routes describing paths to be traveled by vehicle 110 in the course of performing a task like transporting an occupant from a first location to a second location, where location in the present context is defined as the location of a vehicle 110 on earth, for example represented as latitude, longitude and possibly also altitude. In examples wherein vehicle 110 is operating in autonomous mode, a mission can include travel from a storage, parking or service location to a first location to pick up an occupant, travel with the occupant onboard from the first location to a second geo-location to drop off the occupant, and finally travel to a storage, parking or service location, for example. A vehicle 110 mission can include determination of alternate routes for each route in the mission. Alternate routes can be traveled in cases where road closures, due to accidents or construction, for example, cause roads associated with a route to be closed. Adverse traffic conditions can also prompt selection of alternate routes to travel based on determining travel time for routes and alternate routes based on predicted traffic, for example.

Figure 5:
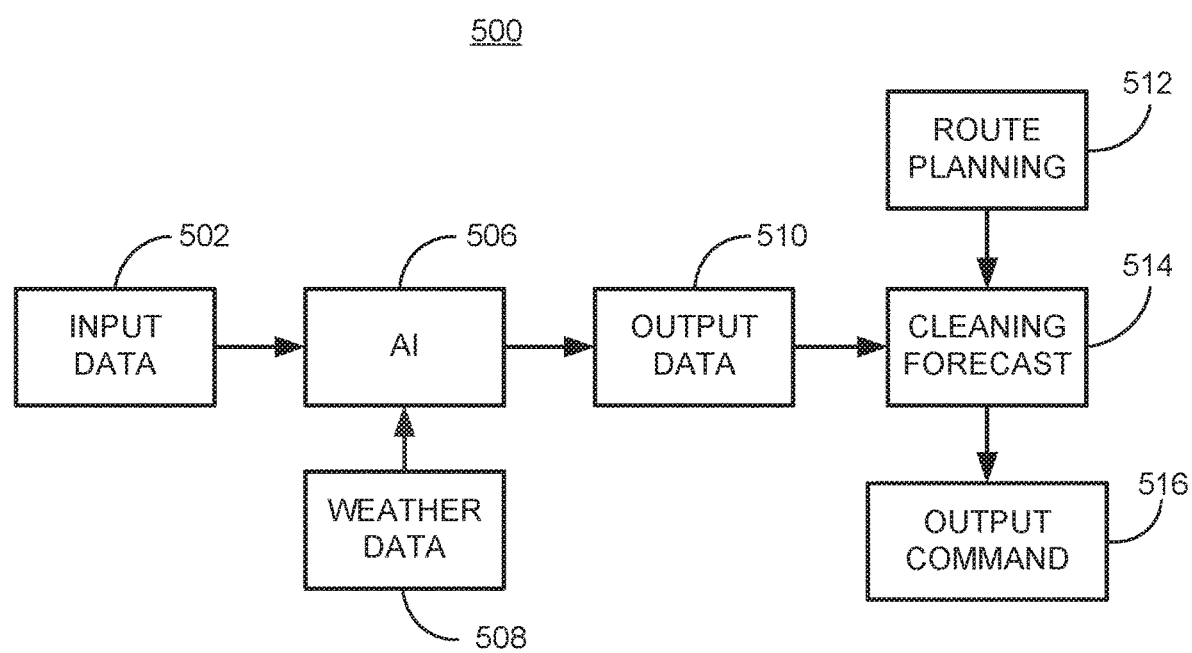
FIG. 5 is a diagram of an example process to determine vehicle commands.

FIG. 5 is a diagram of a cleaning forecast system 500 that combines input data 502 regarding vehicle 110 fluid supply, location, and environment, and real time and forecast weather data 508 with an artificial intelligence (AI) 506 deep learning engine. The AI 506 engine generates output data 510 that is combined with primary and alternate routes associated with a mission to create a cleaning forecast 514 that forecasts cleaning events for vehicle 110. The forecast cleaning events are transferred to output command 516 module, where the forecast cleaning events are compared to available washer fluid to determine whether vehicle 110 has sufficient washer fluid to complete the mission and outputs directions to vehicle 110 based on whether sufficient washer fluid is available. Washer fluid levels should be sufficient to support vehicle 110 travel on a route from its current location to an occupant pickup location and then on a route to the requested drop-off location. It also needs to include further reserve washer fluid so that it can travel on a route to the nearest location where the vehicle can replenish all fluid to full capacity. All mission capability analysis needs to also include enough reserve washer fluid (and fuel) to address traffic contingencies such as emergencies, delays, detours, etc. as well as a potentially large number of alternative routes, that could all result in additional travel time. In examples where vehicle 110 does not have sufficient washer fluid to complete the mission with reserves, vehicle 110 can be actuated by server computer 120 to travel to a service center for washing fluid replenishment while server computer 120 directs a different vehicle 110 to accomplish the mission.

Input data 502 can include vehicle 110 data collected at each cleaning event, where a cleaning event is an occurrence during which computing device 115 actuates one or more nozzles 402, 410, 418 to spray 404, 412, 422 washer fluid onto a protective window 206, 210 or windshield 420 of vehicle 110 to clean the protective window 206, 210 or windshield 420. Examples of input data 502 are included in Table 1.

TABLE 1

Input Data 502

Geographical location and time
Cleaning events to empty estimate
Rain sensor and wiper data
Speed and direction data
Sunlight sensor data
Ambient temperature data
External lighting status At each cleaning event, computing device 115 can determine the time and location of the cleaning event. Each reservoir 408, 416, 426 can be checked to determine a respective fluid level as an estimated remaining number of cleaning events to empty. A rain sensor 116 and a sensor 116 attached to wiper motors can determine current rainfall and wiper data. Vehicle 110 telemetry data, including speed and direction can be determined with sensors 116. In addition, sunlight sensor 116, based on photoelectric technology, can determine the amount of external light falling on vehicle 110, and, along with a temperature sensor 116 and an external lighting status sensor 116 that determines the status of each external light included in vehicle 110, for example headlights, turn lights, stop lights, etc., can permit computing device 115 to determine external environment input data 502.

Input data 502 can be combined with current forecast weather data 508 in an AI 506 deep learning engine. Examples of artificial intelligence deep learning engines include convolutional neural networks, that can receive input data 502 and weather data 508 and can be trained to arrive at predictions regarding washer fluid consumption by providing the neural network with previously determined correct results as feedback to the convolution kernel selection process. By providing examples of correct results, the convolutional neural network learns to recognize patterns of input data and reliably associate correct results (output data 510) with the input data 502. In this example, AI 506 deep learning engine can execute on a server computer 120 that can be in communication with a large number of vehicles 110 in an area or geographic region. The AI 506 deep learning engine can be trained using a large number of cleaning events from a large number vehicles 110 on a large number of missions, sorted by time, location and weather, for example.

Training AI 506 deep learning engine with the use of large vehicle 110 mission datasets, maintained over time, all containing information on each vehicle's 110 sensor 116 cleaning events sorted by weather conditions, location, time of day, etc., makes it possible, using applied artificial intelligence analytics and deep learning methods to determine if the current washer fluid level of any vehicle 110 would be adequate to support a potential requested mission, including a limited number of potential routes along with any a limited number of alternate routes. If a selected vehicle's 110 washer fluid level(s) are not considered satisfactory to support a given mission, then, the server computer 120 could select a different vehicle to support that mission. Not considered satisfactory to support a given mission includes not having sufficient number of cleaning events remaining in vehicle 110 cleaning fluid reservoirs 408, 416, 426 to accomplish a predicted number of cleaning events associated with the potential routes including alternate routes. In this example, server computer 120 would need to place the vehicle 110 out of service and direct it to proceed to a service location to replenish washer fluids, while directing a different vehicle to support the mission.

The AI 506 deep learning engine can provide output data 510 specific to each vehicle 110 providing input data 502 as shown in Table 2.

TABLE 2

Output data 510

Nominal cleaning events per mile
Cleaning events to empty estimate
Multiplication factor for forecast weather
Multiplication factor for location
Multiplication factor for time of day For example, AI 506 deep learning engine can output the nominal cleaning events per mile and an estimated number of cleaning events to empty for each vehicle 110. Based on the general location of vehicle 110, multiplication factors per unit of travel, for example cleaning events per mile traveled based on forecasted weather, location based on route, and time of day can be included in output data 510, where location is the three-dimensional physical location of vehicle 110, for example latitude, longitude and altitude. Output data 510 is transferred to cleaning forecast 514, where routes included in a current mission generated by route planning 512 module can be combined with mission data to generate a predicted number of cleaning events associated with each vehicle 110 mission. Comparing a worst-case forecast for predicted number of cleaning events associated with a mission with an estimated remaining number of cleaning events to empty reported by a vehicle 110 can permit server computer 120 to determine whether vehicle 110 has sufficient number of cleaning events available to complete a mission, assuming that alternate routes and potential delays are included in the predicted number of cleaning events to maximize the number of cleaning events predicted for the mission.

Route planning 512 includes planning a one or more sets of primary and one or more alternate routes for a mission, typically a multi-route mission with two or more sets of primary and one or more alternate routes. Planning a multi-route mission can be initiated by a request to the server computer 120 for transportation by an occupant. For example, first primary and alternate routes associated with the mission can include selecting primary and alternate routes from an occupant pick-up location to an occupant drop-off location. Second primary and alternate routes include selecting a vehicle 110 and routing the vehicle 110 from its storage, parking or service location, for example, to an occupant pick-up location. The vehicle 110 can be selected according to location, wherein the closest vehicle 110 to the pick-up location is selected, for example. Third primary and alternate routes include primary and alternate routes from occupant drop-off location to either a storage, parking or service location or a pick-up location for a next occupant.

Based on output data 510 from AI 506 deep learning engine, and route planning 512 data associated with a mission, cleaning forecast 514 can forecast the number of cleaning events associated with a mission, assuming a worst-case number of cleaning events. The forecast number of cleaning events can be compared to the estimated remaining number of cleaning events to empty to determine if vehicle 110 has sufficient washer fluid to complete the mission. At output command 516, vehicle 110 can be instructed by server computer 120 to either proceed to occupant pick-up location to begin mission or return to a service location for fluid replenishment. Server computer 120 can also instruct vehicle 110 to proceed to occupant pick-up location, then to occupant drop-off location, and then to a service center for fluid replenishment following completion of the mission.

Figure 6:
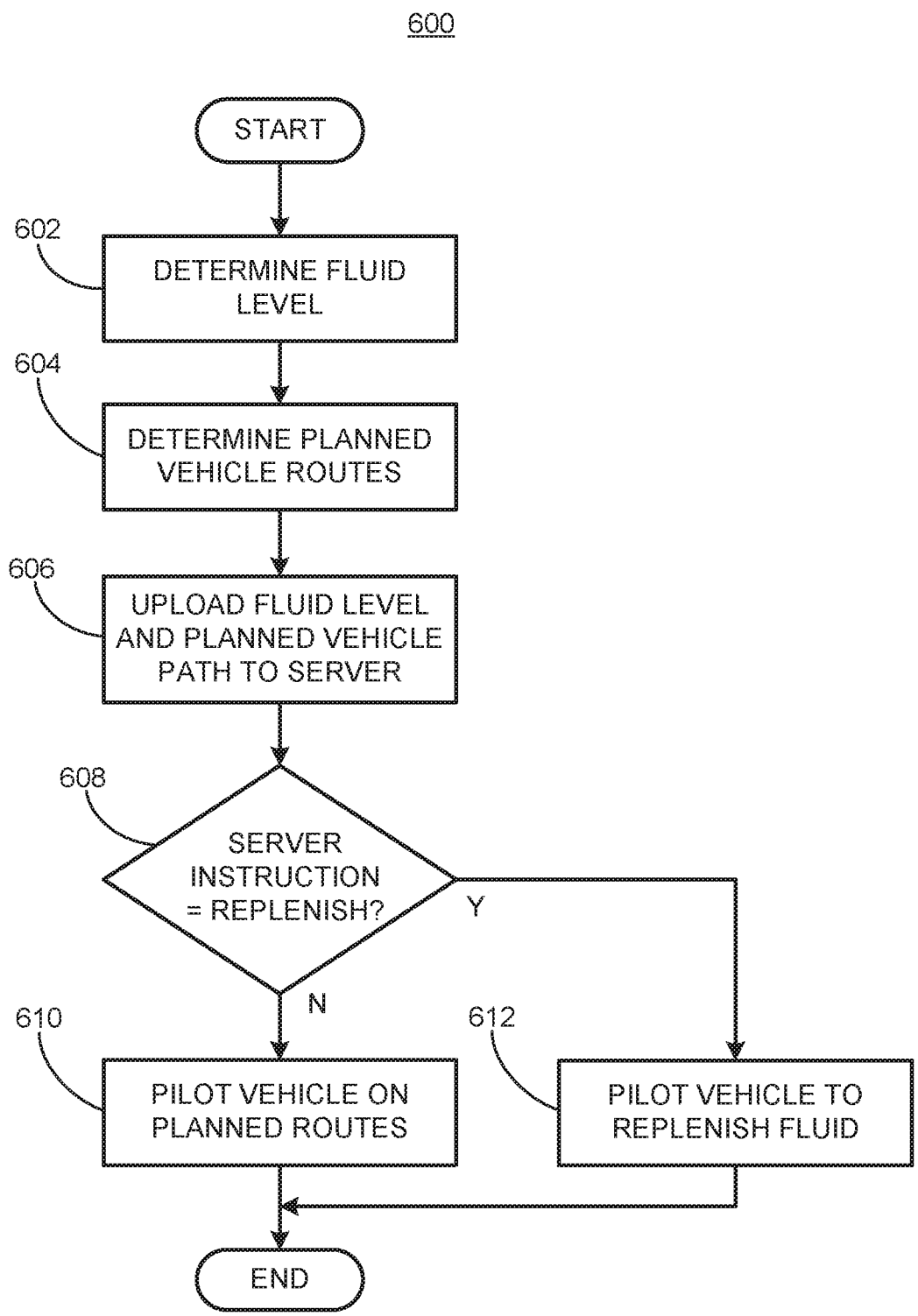
FIG. 6 is a flowchart diagram of an example process to pilot a vehicle.

FIG. 6 is a diagram of a flowchart, described in relation to FIGS. 1-5, of a process 600 for determining whether to pilot a planned route or replenish fluids. Process 600 can be implemented by a processor of computing device 115, taking as input information from sensors 116, and executing commands and sending control signals via controllers 112, 113, 114, for example. Process 600 includes multiple steps taken in the disclosed order. Process 600 also includes implementations including fewer steps or can include the steps taken in different orders.

Process 600 begins at step 602, in which a computing device 115 in a vehicle 110 determines a washer fluid level, where the washer fluid is in one or more reservoirs 408, 416, 426, each associated with a nozzle 402, 410, 418 respectively, for the purpose of cleaning a protective window 206, 210 or windshield 420 of a vehicle 110 as discussed in relation to FIG. 4

At step 604, computing device 115 in vehicle 110 determines a plurality of planned vehicle routes. The plurality of planned vehicle routes can include primary and alternate routes determined by input from an occupant or multiple primary and alternate routes associated with a mission can be downloaded from a server computer 120 via V-to-I interface 111 as discussed above in relation to FIG. 5.

At step 606, computing device 115 can upload fluid levels and other data regarding cleaning events, as discussed in relation to FIG. 5. Computing device can also upload the plurality of planned vehicle routes to server computer 120, unless server computer 120 has already determined the plurality of planned vehicle routes based on input from an occupant, for example, to vehicle 110 at step 604.

Figure 7:
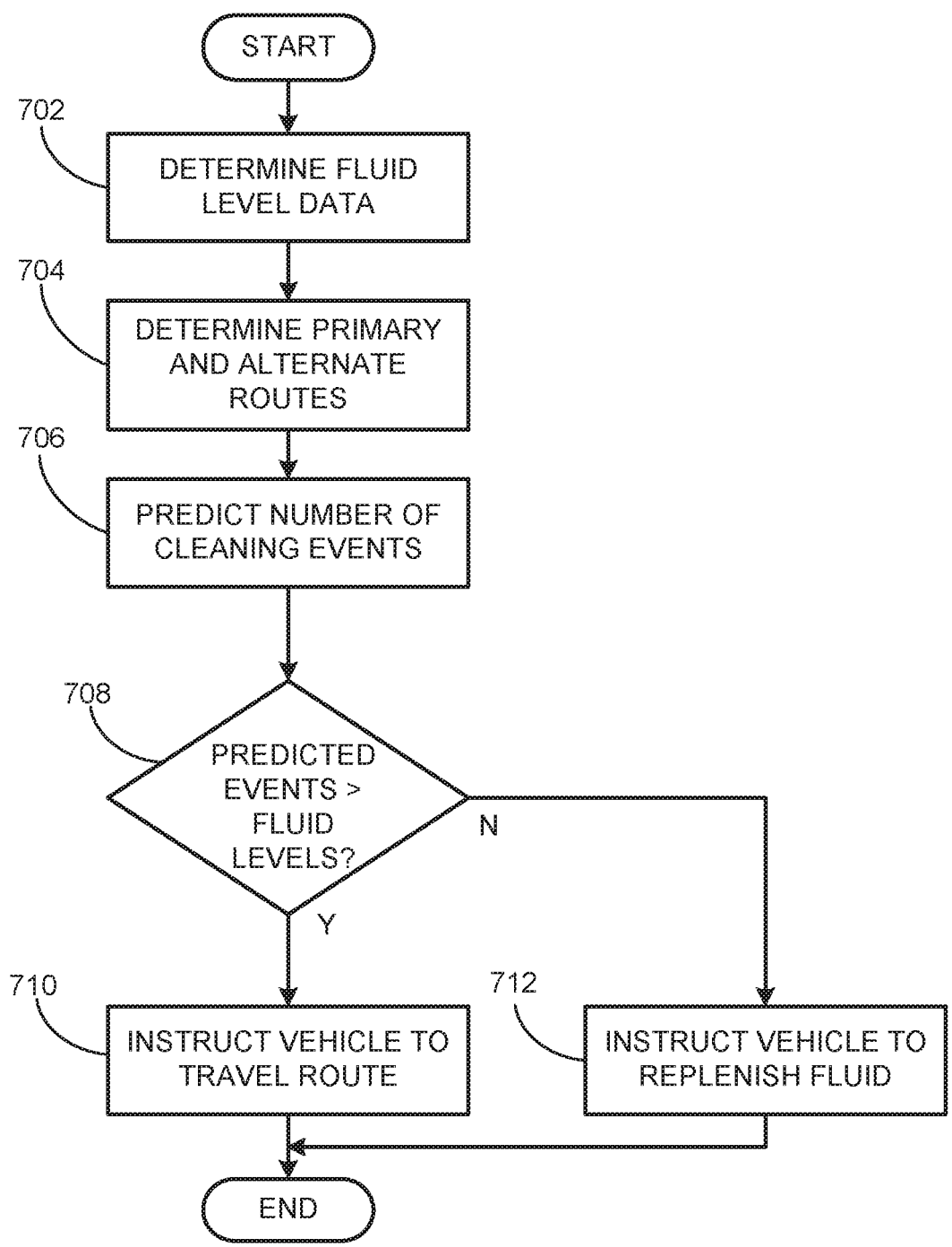
FIG. 7 is a flowchart diagram of an example process to determine vehicle commands.

At step 608, computing device 115 can receive commands from server computer 120 regarding fluid replenishment, which can be determined by server computer 120 as shown in process 700 of FIG. 7. If command at step 608 is "YES", process 600 proceeds to step 612. If the command received at step 608 is "NO", process 600 proceeds to step 610.

At step 610, computing device 115 pilots vehicle 110 on the planned route, traveling on primary or alternate routes according to commands received from server computer 120 while traveling. The planned route can include traveling to a service location during the mission for fluid replenishment. Following step 610 process 600 ends.

At step 612, computing device 115 does not pilot vehicle 110 on the planned route, but rather pilots vehicle to a service location where the fluids in reservoirs 408, 416, 426 can be replenished with washer fluid. Following step 612 process 600 ends.

FIG. 7 is a diagram of a flowchart, described in relation to FIGS. 1-5, of a process 700 for determining vehicle 110 replenishment commands. Process 700 can be implemented by a processor of server computer 120, taking as input information from computing device 115, and executing commands and sending command to computing device 115 in vehicle 110, for example. Process 700 includes multiple steps taken in the disclosed order. Process 700 also includes implementations including fewer steps or can include the steps taken in different orders.

Process 700 begins at step 702, where server computer 120 determines fluid levels by receiving estimated remaining cleaning events to empty for fluid reservoirs 408, 416, 426 of vehicle 110. Server computer 120 can also receive input data 502 from computing device 115 in vehicle 110 including location and time, rain sensor 116 and wiper data, speed and direction, sun sensor 116 data, ambient temperature and external lighting status as shown in Table 1. This data can be input to an AI 506 deep learning engine along with current forecast weather data 508 to produce output data 510 that includes the nominal cleaning events per mile for vehicle 110 given the forecast weather and road conditions, the estimated remaining cleaning events to empty, and multiplication factors for cleaning events per mile for forecasted weather, location and time of day as shown in Table 2 and discussed in relation to FIG. 5.

At step 704, server computer 120 determines primary and alternate routes for a planned route or mission. The server computer 120 can receive the planned route from computing device 115 in vehicle 110 or determine the primary and alternate routes based on a request for transportation, for example, as discussed above in relation to FIG. 5.

At step 706, server computer 120 predicts the number of cleaning events associated with the planned route or mission based on the primary and alternate routes and the output data 510 to form a cleaning forecast 514.

At step 708, server computer 120 compares the predicted number of cleaning events to the estimated remaining cleaning events to empty to determine if sufficient fluid remains to successfully complete the planned route. If the answer is "NO", process 700 proceeds to step 712. If the answer is "YES", process 70 proceeds to step 710.

At step 710, server computer 120 commands computing device 115 in vehicle 110 to direct vehicle 110 to travel on the planned route, thereby accomplishing the planned mission. Following this step process 700 ends.

At step 712, server computer 120 commands computing device 115 in vehicle 110 to direct vehicle 110 to travel to a service location to replenish fluids. Following this step process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a fluid level of a cleaning fluid for a sensor in a vehicle;
   determining a planned vehicle route;
   determining a number of predicted cleaning events for the sensor for the planned vehicle route; and
   after and in response to uploading the cleaning fluid level, the planned vehicle route to a server, actuating a vehicle component to replenish the fluid according to a command from the server.

2. The method of claim 1, wherein the cleaning fluid cleans vehicle sensor windows.

3. The method of claim 1, further comprising determining the planned vehicle route and determining the amount of fluid required per unit distance of travel by communicating with a server computer via a network.

4. The method of claim 3, further comprising determining the planned vehicle route based a location of the vehicle and receiving a request for transportation at the server computer.

5. The method of claim 1, further comprising determining the fluid required per unit of distance traveled based on the planned vehicle route accounting for predicted weather conditions.

6. The method of claim 1, further comprising determining the fluid required per unit of distance traveled based on the planned vehicle route accounting for predicted road conditions.

7. The method of claim 3, further comprising determining whether to actuate the vehicle component to travel the planned vehicle route or actuate the vehicle component to travel to replenish the fluid based on transmitting the fluid level to the server computer and receiving a command from the server computer.

8. The method of claim 7, further comprising receiving, from the server computer, a command to replenish the fluid before completing the planned vehicle route or a command to replenish the fluid at a vehicle service location.

9. A system, comprising a processor; and
   a memory, the memory including instructions to be executed by the processor to:
   determine a fluid level of a cleaning fluid for a sensor in a vehicle;
   determine a planned vehicle route;

determine a number of predicted cleaning events for the sensor for the planned vehicle route; and after and in response to uploading the cleaning fluid level, the planned vehicle route to a server, actuate a vehicle component to replenish the fluid according to a command from the server.

10. The system of claim 9, wherein the cleaning fluid cleans vehicle sensor windows.

11. The system of claim 9, wherein the instructions further comprise instructions to determine the planned vehicle route and determine the amount of fluid required per unit distance of travel by communicating with a server computer via a network.

12. The system of claim 11, wherein the instructions further comprise instructions to determine the planned vehicle route based on receiving a request for transportation at a server computer and a location of the vehicle.

13. The system of claim 9, wherein the instructions further comprise instructions to determine the fluid required per unit of distance traveled based on the planned vehicle route accounting for predicted weather conditions.

14. The system of claim 9, wherein the instructions further comprise instructions to determine the fluid required per unit of distance traveled based on the planned vehicle route accounting for predicted road conditions.

15. The system of claim 11, wherein the instructions further comprise instructions to determine whether to actuate the vehicle component to travel the planned vehicle route or actuate the vehicle component to travel to replenish the fluid based on transmitting the fluid level to the server computer and receiving a command from the server computer.

16. The system of claim 15, wherein the instructions further comprise instructions to receive, from the server computer, a command to replenish the fluid before completing the planned vehicle route or a command to replenish the fluid at a vehicle service location.

17. The system of claim 9, wherein the instructions to determine the number of predicted cleaning events further comprise instructions to determine the number of predicted cleaning events based in part on environmental data.

18. The system of claim 9, wherein the instructions to determine the number of predicted cleaning events further comprise instructions to determine the number of predicted cleaning events based in part on traffic data.

19. A system, comprising a processor; and
a memory, the memory including instructions to be executed by the processor to:
determine a fluid level of a cleaning fluid for a sensor in a vehicle;
determine a planned vehicle route;
determine an amount of cleaning fluid required per unit of distance traveled;
determine a number of predicted cleaning events for the sensor for the planned vehicle route based at least in part on determining the amount of cleaning fluid required per unit of distance traveled; and
actuate a vehicle component to travel the planned vehicle route based on the cleaning fluid level being greater than the amount of fluid required for the planned vehicle route; and
if the cleaning fluid level is not greater than the amount of fluid required for the planned vehicle routes, actuate the vehicle component to travel to replenish the fluid.

20. The system of claim 19, wherein the instructions to determine the number of predicted cleaning events further comprise instructions to determine the number of predicted cleaning events based in part on at least one of environmental data and traffic data.

* * * * *